United States Patent [19]

Asikainen

[11] 4,213,864

[45] Jul. 22, 1980

[54] COMBINATION OF A BIOLOGICAL DRY TOILET AND A BIOLOGICAL WASTE WATER PURIFYING PLANT

[75] Inventor: Aimo Asikainen, Lahti, Finland

[73] Assignees: Asko-Upo Oy, Lahti, Finland; AGA Heating AB, Gotenberg, Sweden

[21] Appl. No.: 2,058

[22] Filed: Jan. 9, 1979

[30] Foreign Application Priority Data

Jan. 24, 1978 [FI] Finland ............................ 780219

[51] Int. Cl.² ............................................. C02C 1/04
[52] U.S. Cl. .................................. 210/151; 210/167; 210/170; 4/111.1; 4/111.6; 4/DIG. 12; 4/318
[58] Field of Search ............... 4/DIG. 12, 111, 111.1, 4/111.5, 111.6, 300, 317, 318, 321, 322; 210/150, 151, 170, 152, 167, 187; 71/12

[56] References Cited

U.S. PATENT DOCUMENTS

| | | | |
|---|---|---|---|
| 3,136,608 | 6/1964 | Lindström | 71/12 |
| 3,175,887 | 3/1965 | van den Berg | 71/12 |
| 4,087,869 | 5/1978 | Billsund | 4/111 |
| 4,107,795 | 8/1978 | Carter et al. | 210/152 |

FOREIGN PATENT DOCUMENTS

772613  9/1977  Finland ................................ 210/151

*Primary Examiner*—Benoit Castel
*Attorney, Agent, or Firm*—Ladas & parry

[57] ABSTRACT

A combination of a biological dry toilet and a biological waste water purifying plant. The combination comprises a tank for composting waste, a means for change of air in the tank, and a sludge sedimentation tank. A biofilter is provided through which the water to be purified is circulated. The combination comprises in addition a means for change of air in the biolfilter, a means for circulating the water to be purified in the biofilter, a means for removing the purified water from the sludge sedimentation tank, a means for removing the sludge from the lower part of the sedimentation tank, a means for feeding the water to be purified through the dry toilet, and a means for mechanically purifying said water in the dry toilet. An equalizing basin is included in the waste water purifying plant, the dry toilet being at least partly submerged in said basin.

2 Claims, 2 Drawing Figures

COMBINATION OF A BIOLOGICAL DRY TOILET AND A BIOLOGICAL WASTE WATER PURIFYING PLANT

The present invention relates to a combination of a biological dry toilet and a biological waste water purifying plant, comprising
- a tank for composting waste,
- a means for change of air in the tank,
- a sludge sedimentation tank,
- a biofilter through which the water to be purified is circulated,
- a means for change of air in the biofilter,
- a means for circulating the water to be purified in the biofilter,
- a means for removing the purified water from the sludge sedimentation tank,
- a means for removing the sludge from the lower part of the sedimentation tank,
- a means for feeding the water to be purified through the dry toilet, and
- a means for mechanically purifying said water in the dry toilet.

The combination according to the invention is intended for sewerless houses for treating, in cooperation by means of a biological dry toilet and a biofilter, toilet and kitchen waste and the so called grey water produced in households.

E.g., the following arrangements are previously known:

(1) A biological and/or chemical waste water purifying plant to which also a water closet is connected.

(2) A biological and/or chemical waste water purifying plant and a separate biological dry toilet the operations whereof are in no way combined.

The biggest disadvantages of the arrangement according to above point (1) are the following:

(a) The plant must due to its fairly big size be placed outdoors and the utilization of the heat energy contained by the waste water is difficult.

(b) Due to pathogenic danger, the purified water must often be chlorinated.

(c) For sludge removal, a special vehicle must be used the access whereof to the plant must be ensured.

(d) To place such sludge on a dumping ground may be forbidden in future.

Besides these disadvantages, the arrangement according to above point (2) has the following disadvantages:

(a) The carbon/nitrogen ratio of the dry toilet remains too small due to the small amount of carbon wherefore composting is retarded and/or remains incomplete.

(b) To accelerate the composting, electric heating must usually be used wherefore the energy consumption increases.

Copending application Ser. No. 968,548 discloses a combination of a biological dry toilet and a biological waste water purifying plant by means of which it has been possible to eliminate the above mentioned disadvantages to a considerable extent. Characteristic of this combination is that the operations of the biological dry toilet and the biological waste water purifying plant are combined so that in the combination the heat in the so called grey water and solid waste from households are recovered in the dry toilet to which also the sludge from the waste water purifying plant is pumped. The heat obtained is used for heating the compost, and the waste and sludge collected in the filters are from time to time combined to compost them together with the other waste in the dry toilet.

It is the object of the present invention to further improve the operation of a combination of the above mentioned type.

The invention is based on the idea of using an equalizing basin, the use whereof in connection with a waste water purifying plant is previously known per se, and by submerging the biological dry toilet partly in this basin.

More specifically, the combination according to the invention is mainly characterized by an equalizing basin included in the waste water purifying plant, the dry toilet being at least partly submerged in said basin.

By means of the invention, the following advantages are obtained:

The heat in the grey water will be efficiently utilized for heating the compost, whereby the composting time is shortened.

The entire combination (dry toilet, equalizing basin, waste water purifying plant) forms a compact whole, whereby
- the installation on the site of use is simplified,
- the required floor area is small, and
- connecting pipes and conduits are short.

The invention will be described in more detail in the following by means of the embodiment according to the accompanying drawing.

Figures 1, 2:
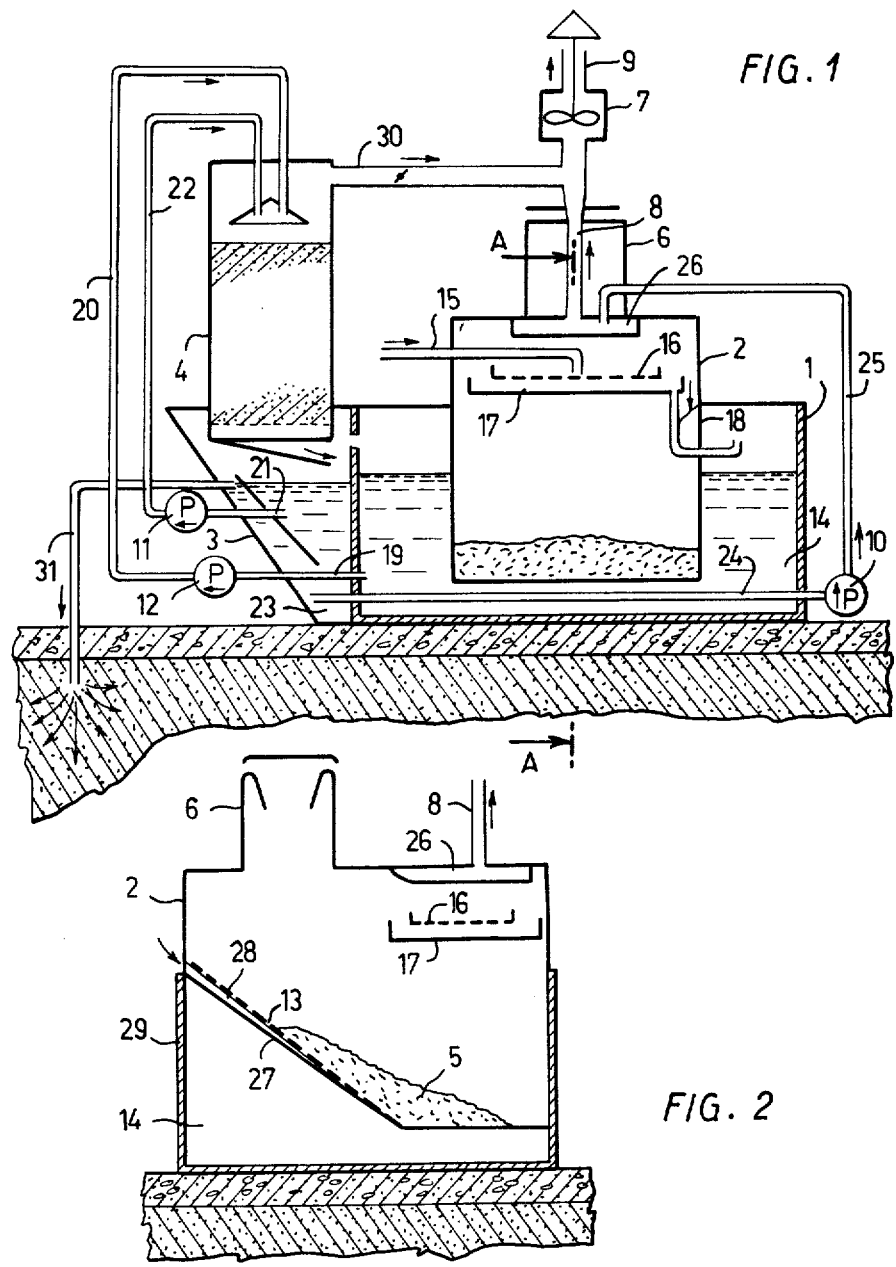
FIG. 1 is a schematic longitudinal section of one preferred embodiment of the combination according to the invention.
FIG. 2 is a section taken along line A—A in FIG. 1.

In principle, the construction and operation of the combination are similar to that described in copending application Ser. No. 936,548 except that in the present invention an equalizing basin is used. Moreover, both the pumping of sludge and circulation pumping are carried out by separate pumps 10 and 11, whereas they were in the above mentioned application combined to be carried out by a common pump (this is not a substantial difference). The pumping of grey water from the equalizing basin 1 through a biofilter 4 to a sludge sedimentation tank 3 takes place by means of a pump 12. A separate pump according to the above mentioned application is normally not meant to be used, but the water is led to absorption by means of overflow. When the equalizing basin is in use, the water surface in the sludge sedimentation tank stays at a constant level.

The combination includes a tank-like dry toilet 2. Composting waste 5 is located in its lower part. The upper part is provided with a seat 6 and a suction fan 7 which through a pipe 8 changes the air in the tank and blows it through another pipe 9 to the air outside. Air to the lower part of the dry toilet is taken through openings 13 in the bottom thereof.

The equalizing basin 1 included in the combination is so shaped that the grey water therein forms a water jacket on the side and bottom surfaces on the dry toilet.

The waste water purifying plant comprises the sludge sedimentation tank 3 serving also as a circulation tank for the water to be purified and the biofilter 4.

The combination functions as follows:

Grey water 14 arrives through a pipe 15 to a filter means 16 inside the dry toilet 2 and through it to a collecting basin 17 and further through a pipe 18 to the equalizing basin 1. From there, grey water 14 is pumped through pipes 19 and 20 by means of the pump 12 further through the biofilter 4 to the sludge sedimentation tank 3. The quantity to be pumped is chosen to correspond to the normal incoming quantity of grey water in 24 hours, and the pumping preferably takes place in several short periods during 24 hours. The load of the biofilter thus remains as constant as possible.

The biological purification itself takes place in a way known per se by circulating water in the sedimentation tank 3 through the pump 11, pipes 21 and 22 as well as the biofilter 4. The sludge collected on the bottom of the sludge sedimentation tank 3 is pumped through a pipe 24, the pump 10 and a pipe 25 into a dewatering means 26 (e.g., a filter or an evaporator) placed inside the dry toilet 2. The waste collected in the means 26 and in the filter means 16 is from time to time removed and mixed with the compost 5.

Air coming through the openings 13 in the dry toilet 2 may be preheated by means of ribs arranged on a bevelled surface 27 of the dry toilet 2 or of the equalizing basin 1. The equalizing basin 1 may, moreover, on its outer surface be provided with a heat insulation.

As also the biofilter 4 needs air, it may be connected by means of a pipe 30 to the suction fan of the dry toilet.

The purified water is drained according to the overflow principle by means of a pipe 31 from the upper part of the sludge sedimentation tank 3, for example, for absorption in the soil.

Within the scope of the invention, numerous arrangements differing from the above described embodiment may be contemplated. Thus, the walls of the dry toilet in contact with the grey water may be provided with ribs or similar means improving the transfer of heat.

The waste water purifying plant may in turn be separated from the combination of dry toilet and equalizing basin.

The dry toilet may differ in shape from the one shown in the drawing. Its bottom can be, for example, horizontal.

In order to improve the transfer of heat, the walls of the composting space facing the equalizing basin can be provided with heat transfer means.

Air going to the compost can be preheated by means of ribs arranged on the outer surface of the equalizing basin.

In addition to heating the compost, the heat energy of the equalizing basin can be utilized, e.g., also as follows:

(1) A heat exchanger is placed in the equalizing basin by means of which
 (a) water for the preparation of warm household water or
 (b) air needed to heat the building are preheated.

(2) The heat energy in the purified water is recovered by means of an evaporator of a heat pump plant to be placed in the outlet pipe 31 or in an extension thereof. The condenser of the plant is placed, for example, in the accumulator for warm household water. The condenser may also be used for heating the air in the building.

I claim:

1. An integrated domestic sewage disposal and water purification system comprising in combination:
 a dry toilet tank;
 an equalizing basin forming a water jacket around said dry toilet tank;
 a biofilter through which the water to be purified is circulated;
 a sludge sedimentation tank located below said biofilter and having an upper part and a lower part;
 first pipe means including a first pump for removing water from the upper part of the sedimentation tank to the biofilter;
 second pipe means including a second pump for removing sludge from the lower part of the sedimentation tank to a point in the upper part of the dry toilet tank;
 third pipe means for feeding gray water from the household to filter means inside the dry toilet and then to a collecting basin;
 fourth pipe means connecting said collecting basin to the equalizing basin;
 fifth pipe means including a third pump for feeding water from the equalizing basin to the biofilter; and
 overflow pipe means for discharging excess water from the upper part of the sedimentation tank to ground.

2. An integrated system as claimed in claim 1, wherein a common ventilator system is arranged to change the air in the toilet tank and above the biofilter.

* * * * *